United States Patent Office 3,746,629
Patented July 17, 1973

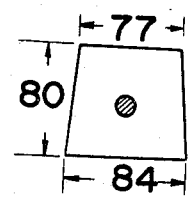
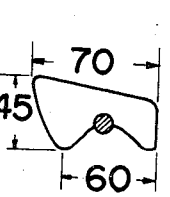
FIG. 6a  FIG. 6b  FIG. 6c
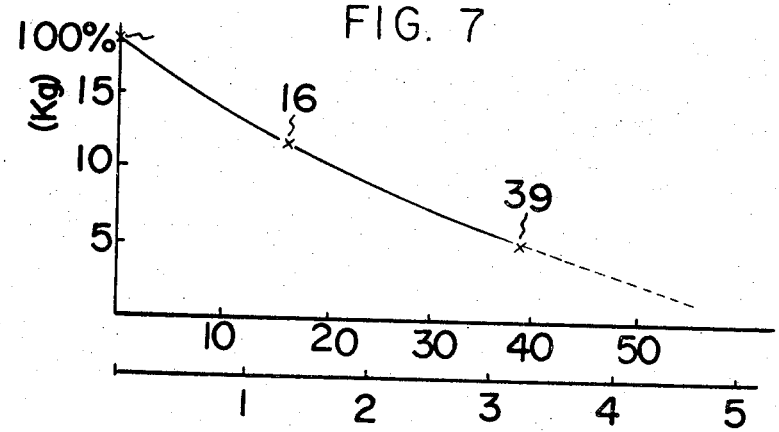
FIG. 7
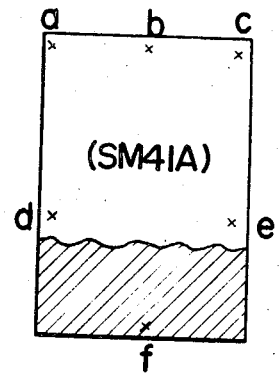
FIG. 8

3,746,629
METHOD OF PREVENTING CORROSION OF THE BOTTOM OF BLAST FURNACE IMMERSED IN COOLING WATER
Ryoji Nishikata and Toshio Fujieda, Yokohama, Japan, assignors to Nippon Kokan Kabushiki Kaisha, Tokyo, Japan
Filed Nov. 27, 1970, Ser. No. 93,041
Claims priority, application Japan, Dec. 9, 1969, 44/98,518
Int. Cl. C23f 13/00; C21b 7/10
U.S. Cl. 204—148   7 Claims

ABSTRACT OF THE DISCLOSURE

In a blast furnace of the type wherein the steel or iron bottom of the furnace is immersed in cooling water, electrodes of metal having lower electrochemical (or electrode) potential than steel or iron are electrically connected through conductors to the portions of the furnace bottom which are required to be protected from corrosion so as to cause the electrodes to be corroded by utilizing the natural potential difference prevailing between the electrodes and the portions thereby protecting said portions against corrosion. The furnace bottom is supported by spaced supports which provide cooling water passages therebetween.

BACKGROUND OF THE INVENTION

This invention relates to a method of protecting against corrosion the iron or steel casing at the bottom of a blast furnace of the type wherein the furnace bottom is cooled by fresh water or sea water.

Since the bottom of a blast furnace of the type described above is immersed in fresh water or sea water for cooling, the bottom is often corroded severely and it is the practice to increase the thickness of the casing to withstand such corrosion. Where a coat of paint is applied on the surface of the casing to improve corrosion resistance, the useful life of such a paint is only one year and it is impossible to reapply such protective coating once the operation of the furnace is started. At present it is difficult to obtain a protective coating which is durable for several years. Moreover, as the cooling water is used in a large quantity, adequate control thereof is difficult. When the pH of the cooling water reaches 4 to 5, corrosion activity is increased and this tendency is more prominent when sea water is used.

SUMMARY OF THE INVENTION

It is an object of this invention to provide a novel method of effectively protecting against the corrosion of a blast furnace bottom immersed in cooling water.

Another object of this invention is to provide a simple, inexpensive and effective method of protecting against corrosion a blast furnace bottom normally in contact with cooling water, especially sea water.

According to this invention, metal electrodes having lower potential such as zinc, manganese, aluminium or alloys thereof than the metal comprising the furnace bottom are electrically connected to portions of the furnace bottom such as the bottom plate and supports thereof which are normally in contact with the cooling water so as to cause the electrodes to be corroded by utilizing the natural potential difference prevailing between the electrodes and the surrounding cooling water thereby preventing corrosion of the furnace bottom.

By this method the structural metal plates of the furnace bottom are effectively protected from corrosion until the elecrodes are completely corroded.

BRIEF DESCRIPTION OF THE DRAWINGS

FIGS. 6a, 6b and 6c show various stages of wear of the anode;

FIG. 7 is a plot to show the progress of the anode wear; and

FIG. 8 is a plan view of a test piece.

DESCRIPTION OF THE PREFERRED EMBODIMENT

Figure 1:
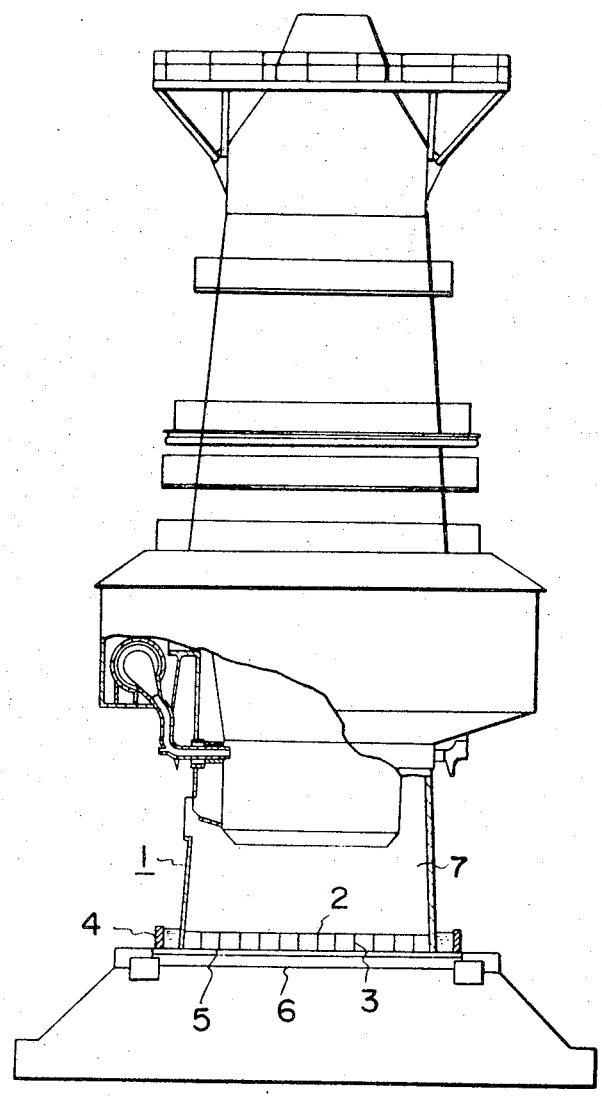
FIG. 1 shows a side elevation of a blast furnace embodying the corrosion protection method according to the invention, the lower portion of the furnace being shown in section.
Figure 2:
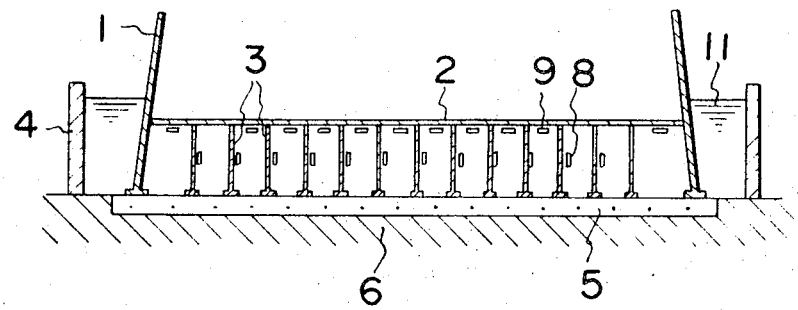
FIG. 2 shows a vertical sectional view of the furnace bottom.
Figure 3:
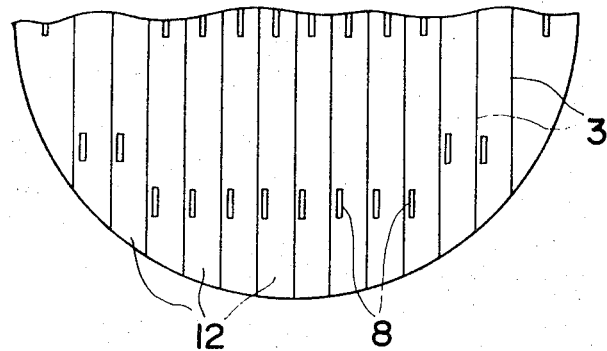
FIG. 3 is a plan view of a portion of the furnace bottom.
Figure 4:
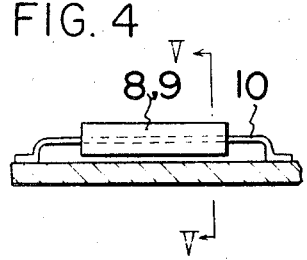
FIG. 4 shows a side view of an anode.
Figure 5:
FIG. 5 is a cross-sectional view of the anode shown in FIG. 4 taken along a line V—V.

Referring now to the accompanying drawings, the lower portion 1 of the blast furnace comprises a steel casing of conical form. A circular bottom plate 2 is welded to the lower portion and is supported by a plurality of substantially parallel vertical supports 3. As shown in FIG. 2, vertical supports 3 are generally in the shape of an I-beam. A cylindrical dam 4 surrounds the furnace bottom and cooling water 11 is contained in the dam to immerse and cool the furnace bottom. The blast furnace is mounted on a concrete base 6 through grouting 5. The lower portion of the furnace is filled with bricks 7 (see FIG. 1).

Conductors 10, extending through anodes 8 and 9 made of metal of lower electrochemical potential than steel, are welded to bottom plate 2 and supports 3, respectively. Cooling water 11, sea water for example, is circulated through passages 12 provided between supports 3.

Due to the natural potential difference prevailing between the anodes and the casing, current flows to anodes 8 and 9 from adjacent surfaces of the bottom plate 2 and supports 3 through the cooling water.

Electrodes of low electrochemical potential metals such as zinc, manganese and aluminum operate as anodes and the type and dimensions of the anodes are suitably selected by considering the area which it is required to protect against corrosion. In one example, anodes 8 and 9 are disposed such that the bottom plate 2, lower portion 1 and supports 3 assume −800 mv. Thus, when the voltage of the surface to be protected decreases below −800 mv., corrosion proceeds. An aluminum alloy was used for anodes 8 and 9. The electrode potential of aluminum in sea water is −0.78 v.

FIG. 6 shows the progress of corrosion or wear of an anode having a length of 1000 mm. and a trapezoidal cross-sectional configuration (height—80 mm., upper side— 77 mm., lower side—84mm.). FIG. 6a shows the cross-sectional configuration of the anode before use, FIG. 6b that of the anode after use for 16 months and FIG. 6c that of the anode after use for 39 months.

Table 1 below shows the wear of the anodes.

TABLE 1

|  | Weight of the anode, kg. | Anode dimensions |
|---|---|---|
| Before use | 18.1 | (77+84) x 80 x 1,000 mm. |
| After 16 months | 13.6 | (70+75) x 70 x 950 mm. |
| After 39 months | 5.4 | (60+70) x 37 x 920 mm. |

To demonstrate the effect of the present method of preventing corrosion, using aluminum alloy anodes as referred to above, 6 test pieces of the same material (SM41A) as the furnace bottom plate were secured to the furnace bottom plate. Three of them were insulated from the furnace bottom with vinyl to give a standard for comparison. Table 2 below shows the result of a test for 23 months.

TABLE 2

| Test piece | Weight, grams | | | Thickness, mm. | | | | | |
|---|---|---|---|---|---|---|---|---|---|
| | Before use | After 23 months | Loss | (a) | (b) | (c) | (d) | (e) | (f) |
| 1 | 87.6 | 83.1 | 4.5 | 2.0 | 1.95 | 1.7 | 2.0 | 2.0 | 2.0 |
| 2 | 88.1 | 68.0 | 20.1 | 1.6 | 1.6 | 1.7 | 1.45 | 2.2 | |
| 3 | 88.0 | 81.2 | 6.8 | 2.0 | 1.95 | 2.0 | 2.0 | 2.0 | 2.0 |
| 4 | 87.0 | Dropped | | | | | | | |
| 5 | 86.2 | 78.8 | 7.4 | 2.0 | 1.85 | 1.9 | 1.85 | 1.95 | 2.0 |
| 6 | 87.5 | Dropped | | | | | | | |

Remarks.—In this table, test pieces 2, 4 and 6 were insulated with vinyl. Positions of portions (a) through (f) are shown in Fig. 8. The part of each test piece cross-hatched in Fig. 8 was coated with vinyl.

From Table 2 it will be clearly noted that when electrodes of aluminum alloy are secured to the steel bottom of a blast furnace, the furnace bottom can be protected against corrosion.

The weight of the electrodes decreased to 30% of the original value after operation for 39 months, as shown in FIG. 7. Extension of the curve shown in this figure shows that after additional operation for 20 months, the electrodes will completely disappear, at which time more severe corrosion of the structural steel would commence. For this reason, it is necessary to renew the electrodes at the proper time.

The result also shows that the test pieces connected to electrodes were sound and their weight loss was only 7% whereas of those insulated with vinyl, two were dropped and one lost 23% of its weight. From this it can be noted that the electrodes provided in accordance with this invention can reduce corrosion to about one third of what it may otherwise be.

Thus, this invention provides an effective method of protecting against corrosion of blast furnace bottoms. The invention is particularly effective when sea water is used as the cooling water. Moreover, by measuring the potential of the structure it is possible to know the degree of corrosion thereof.

What is claimed is:

1. In a blast furnace having a steel or iron bottom immersed in cooling water, the method of protecting said bottom against corrosion comprising the steps of:
   supporting said furnace bottom by a plurality of elongated spaced, generally I-beam shaped supports the lengths of which run in the horizontal direction and the large faces of which are substantially vertically oriented and substantially parallel, said spaced supports defining a plurality of substantially parallel unobstructed cooling water passages between adjacent supports;
   passing cooling water through said passages, said cooling water contacting at least a number of said supports; and
   electrically connecting metal electrodes which are higher the EMF series than the metal of said furnace bottom through electric conductors to portions of the furnace bottom which are required to be protected from corrosion so as to cause said electrodes to be corroded by utilizing the natural potential difference prevailing between said electrodes and said furnace bottom portions, thereby protecting against corrosion of said furnace bottom portions.

2. The method according to claim 1 wherein said electrodes are made of a metal selected from the group consisting of zinc, magnesium, aluminum and alloys thereof.

3. The method according to claim 1 wherein said cooling water is sea water.

4. The method according to claim 1 wherein said cooling water contacts all of said supports.

5. The method according to claim 1 including electrically connecting a plurality of said metal electrodes to respective given portions of said supports.

6. The method according to claim 1 wherein said supports are made of the same metal as said furnace bottom.

7. The method according to claim 1 wherein said furnace bottom is a plate supported by said spaced supports.

References Cited
UNITED STATES PATENTS

| 714,565 | 11/1902 | Dunford | 266—43 |
|---|---|---|---|
| 796,175 | 8/1905 | Baggaley | 266—43 |
| 2,323,265 | 6/1943 | Willetts | 266—43 |
| 2,950,570 | 8/1960 | Cowles et al. | 266—43 |
| 2,890,157 | 6/1959 | Raetzsch | 204—196 |
| 3,001,924 | 9/1961 | Battis et al. | 204—197 |
| 3,084,742 | 4/1963 | Davies et al. | 204—197 |
| 3,137,642 | 6/1964 | Johns | 204—148 |
| 3,475,304 | 10/1969 | Currey | 204—147 |

TA-HSUNG TUNG, Primary Examiner

U.S. Cl. X.R.
204—197; 266—25